United States Patent Office 3,275,664
Patented Sept. 27, 1966

3,275,664
4-HYDROXY-3,6-DIKETO STEROIDS AND ENOL ETHERS CORRESPONDING
Harold Levy, Shrewsbury, Mass., and Alex D. Tait, Cardross, Scotland, assignors to G. D. Searle & Co., Chicago, Ill., a corporation of Delaware
No Drawing. Filed Oct. 21, 1964, Ser. No. 405,605
9 Claims. (Cl. 260—397.4)

The present invention is concerned with novel steroids of the pregnane and antrostane series and, more particularly, with 4-hydroxy-$\Delta^4$-3,6-diones and the corresponding 3-(lower alkyl) enol ethers represented by the following structural formulas

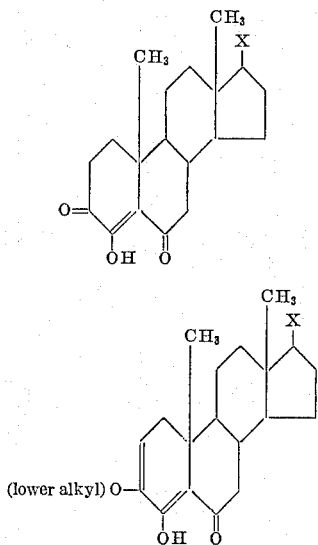

wherein X can be a hydroxy, (lower alkanol)oxy or acetyl radical.

Examples of the lower alkyl radicals designated above are methyl, ethyl, propyl, butyl, pentyl, hexyl, and the branched-chain groups isomeric therewith. The lower alkanoyl radicals are typified by acetyl, propionyl, butyryl, valeryl, caproyl, and the branched-chain isomers thereof.

Starting materials suitable for the manufacture of the compounds of the present invention are the 6-keto substances of the structural formula

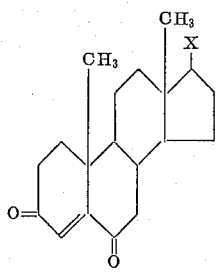

wherein X is a hydroxy, (lower alkanoyl)oxy, or acetyl group. Hydroxylation of the 4,5-unsaturated linkage affords the corresponding 4,5-diols, and the latter substances can be dehydrated in acid medium to yield the desired 4-hydroxy-3,6-diketo products. Those processes are specifically illustrated by the reaction of pregn-4-ene-3,6,20-trione with hydrogen peroxide and osmium tetroxide in tertiary-butyl alcohol and dehydration of the resulting 4,5-dihydroxypregnane-3,6,20-trione by heating with concentrated hydrochloric acid in glacial acetic acid to produce 4-hydroxypregn-4-ene-3,6,20-trione. The instant enol ethers are conveniently prepared by reaction of the parent ketone with the appropriate alkanol in the presence of an acid catalyst. 4,17β-dihydroxyandrost-4-ene-3,6-dione, for example, is contacted with methanol and concentrated hydrochloric acid, thus affording 4,17β-dihydroxy-3-methoxyandrosta-2,4-dien-6-one.

In the preparation of the instant 4-hydroxy-3,6-diketo compounds there is formed also, in minor amount, an isomeric material which apparently consists of an equilibrium mixture of the tautomers shown below:

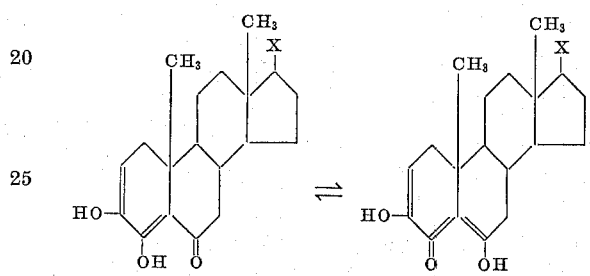

In the latter representations, X can be a hydroxy, (lower alkanoyl)oxy or acetyl group. Those isomers are quite unstable, however, and can readily be converted to the stable 4-hydroxy-3,6-diketo compounds.

The compounds of the present invention are useful as a result of their ability to form chelates with a variety of metallic cations. They are thus valuable sequestering agents. Reaction of 3-ethoxy-4-hydroxypregna-2,4-diene-6,20-dione, for example with cupric acetate in ethanol, affords the corresponding copper chelate.

The invention will be described more fully in the following examples which are to be considered illustrative only and not as limiting the invention either in spirit or in scope. In these examples, temperatures are given in degrees centigrade (°C) and quantities of materials in parts by weight unless otherwise noted.

*Example 1*

A mixture of 4 parts of pregn-4-ene-3,6,20-trione with 180 parts of tertiary-butyl alcohol is heated at the reflux temperature for about 10 minutes, and the resulting solution is cooled to room temperature. To that mixture is then added successively 0.5 part of osmium tetroxide and 8 parts by volume of 30% hydrogen peroxide, and the resulting reaction mixture is allowed to stand at room temperature for about 16 hours. At the end of that time, the white crystals which have formed are collected by filtration and washed on the filter with tertiary-butyl alcohol to afford 4,5-dihydroxypregnane-3,6,20-trione, melting at about 230°–240°. An additional quantity of material is isolated from the filtrate by dilution with a mixture of methylene chloride and ethyl acetate, washing of that solution successively with aqueous sodium bisulfite and water, drying over anhydrous sodium sulfate, and evaporation to dryness.

Example 2

To a solution of 2.3 parts of 4,5-dihydroxypregnane-3,6,20-trione in 1365 parts of glacial acetic acid is added 120 parts of concentrated hydrochloric acid, and the resulting reaction mixture is heated at the reflux temperature for about one hour. The cooled solution is diluted with a large quantity of water, then is extracted with ether. The ether extract is washed with water to neutrality, then is dried over anhydrous sodium sulfate. The yellow crystalline solid obtained by evaporation of the solvent is purified by chromatography on diatomaceous earth, utilizing 20% aqueous methanol as the stationary phase, followed by elution with 30% benzene in hexane. Recrystallization first from acetone, then from ethyl acetate of the fraction isolated from that eluate affords pure 4-hydroxypregn-4-ene-3,6,20-trione, melting at about 210–213°. It displays also an optical rotation of $+150°$ in chloroform and an ultraviolet absorption maximum in menthanol at about 315 millimicrons with a molecular extinction coefficient of 7920. Infrared absorption peaks are observed at about 2940, 1704, 1610, 1562, 1471, 1387, 1353, 1263, 1230, 1195, 1185, 1155, 1110, and 905 reciprocal centimeters. This substance is characterized further by the following structural formula

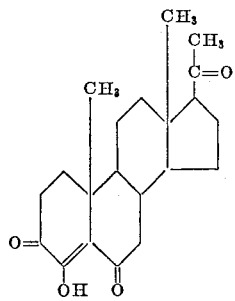

Example 3

A solution of 1.19 parts of 4,5-dihydroxypregnane-3,6,20-trione, 19.2 parts of concentrated hydrochloric acid, and 77 parts of absolute ethanol is heated at the reflux temperature for about 1½ hours, then is allowed to stand at room temperature for about 7 days. The reaction mixture is diluted with water and extracted with ether. The ether layer is separated, washed with saturated aqueous sodium bicarbonate, dried over anhydrous sodium sulfate, and evaporated to dryness to afford the crude product. This crude product is dissolved in benzene, then is chromatographed on a silica gel column. Elution of that column with 5% ethyl acetate in benzene affords first 3-ethoxy-4-hydroxypregna-2,4-diene-6,20-dione, melting at about 168–170° after recrystallization from ethyl acetate. A second recrystallization from ethyl acetate affords a pure sample, melting at about 171–173°. It is further characterized by an optical rotation in chloroform of $+87°$ and also by ultraviolet absorption peaks in methanol at about 275 and 339 millimicrons with molecular extinction coefficients of about 5150 and 8050, respectively. It displays also infrared absorption maxima, in a potassium bromide disc, at about 3070, 2930, 1700, 1632, 1586, 1408, 1371, 1357, 1260, 1178, 1050, and 960 reciprocal centimeters. This substance is represented by the following structural formula

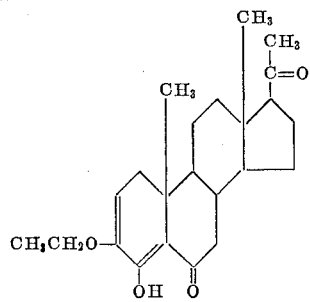

The later 5% ethyl acetate in benzene eluates afford 4-hydroxypregn-4-ene-3,6,20-trione, identical with the product of Example 2.

Example 4

To a solution of one part of 3-ethoxy-4-hydroxypregna-2,4-diene-6,20-dione in 20 parts of ethanol is added 10 parts by volume of saturated aqueous cupric acetate, and the resulting solution is diluted with water, partially concentrated, then cooled and filtered to afford a green amorphous precipitate of the copper complex, melting at about 210–220°. Purification by recrystallization twice from ethanol, then from chloroform-ethanol, affords a sample melting at about 244–246°, displaying an optical rotation of $-137°$ in chloroform, and exhibiting ultraviolet absorption peaks (1% in methanol) at about 282 and 352 millimicrons with extinction coefficients of 141 and 169, respectively, and also infrared absorption maxima at about 3400, 3000–2840, 1700, 1638, 1550, 1443, 1380, 1353, 1230, 1180, and 1047 reciprocal centimeters.

Example 5

A suspension of one part of the copper chelate of 3-ethoxy-4-hydroxypregna-2,4-diene-6,20-dione in 20 parts of ether containing 5 parts of 1 N hydrochloric acid is shaken, and a small quantity of ethanol is added to afford complete miscibility. The ether layer is separated, and the aqueous layer is extracted with fresh ether. The combined ether layers are washed successively with water and saturated aqueous sodium bicarbonate, then dried over anhydrous sodium sulfate and concentrated to dryness to produce 3-ethoxy-4-hydroxypregna-2,4-diene-6,20-dione, identical with the product of Example 3.

Example 6

To a cooled solution of 4 parts of 17β-hydroxy-androst-4-ene-3,6-dione in 180 parts of teriary-butyl alcohol is added successively 0.5 part of osmium tetroxide and 8 parts by volume of 30% aqueous hydrogen peroxide. The resulting reaction mixture is stored at room temperature for about 16 hours and the crystals which form during that period are collected by filtration, washed on the filter with tertiary-butyl alcohol, and dried to afford 4,5,17β-trihydroxyandrostane-3,6-dione.

An additional quantity of this product is obtained from the filtrate by dilution with ethyl acetate and methylene chloride, followed by successive washings with aqueous sodium bisulfite and water, drying over anhydrous sodium sulfate and evaporation to dryness under reduced pressure.

Example 7

To a solution of one part of 4,5,17β-trihydroxy-androstane-3,6-dione in 157.5 parts of glacial acetic acid is added 12 parts of concentrated hydrochloric acid, and the resulting reaction mixture is heated at the reflux temperature for about 45 minutes, then is cooled to room temperature, diluted with water, and extracted with ether. The ether extract is washed with water until neutral, dried over anhydrous sodium sulfate, and concentrated to dryness under reduced pressure to afford a yellow crystalline solid. That solid material is chromatographed on a partition column containing diatomaceous earth with 20% aqueous methanol as the stationary phase. Elution with 10% benzene in hexane affords off-white crystals which are recrystallized several times from ethyl acetate to afford yellow needles of crude 17β-acetoxy-4-hydroxyandrost-4-ene-3,6-dione, melting at about 190°. Elution of the column with 20% benzene in hexane affords yellow crystals which are purified by crystallization first from ethyl acetate then from methanol to yield yellow needles of pure 17β-acetoxy-4-hydroxyandrost-4-ene-3,6-dione, melting at about 195–197°. It displays an ultraviolet absorption maximum in methanol at about 316 millimicrons with a molecular extinction coefficient of about 7970 and also infrared absorption peaks, in a potassium bromide disc, at about 1730, 1698, 1613, 1569, 1240, 1025, and 905 reciprocal centimeters. This compound is further characterized by the following structural formula

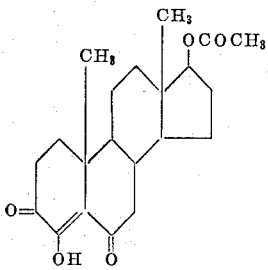

Example 8

To a solution of 1.2 parts of 4,5,17β-trihydroxy-andostane-3,6-dione in 144 parts of acetone is added 11.4 parts of concentrated hydrochloric acid, and the resulting reaction mixture is heated at the reflux temperature for about one hour, then is cooled to room temperature and diluted with ether and water. The aqueous layer is separated, washed with ether, and the ether washings combined with the original organic extract. The combined extracts are washed with water, dried over anhydrous sodium sulfate, then stripped of solvent under reduced pressure to afford a yellow crystalline residue. This residue is chromatographed on a partition column containing diatomaceous earth with 20% aqueous methanol as the stationary phase. Elution of the column with 60% benzene in hexane affords the crude product, which is purified by crystallization first from ethyl acetate then from methanol to afford pure 4,17β-dihydroxyandrost-4-ene-3,6-dione, melting at about 141–144°. It exhibits an ultraviolet absorption maximum in methanol at about 317 millimicrons with a molecular extinction coefficient of about 6850 and also infrared absorption peaks, in a potassium bromide disc, at about 3400, 1711, 1628, 1570, 1470–1445, 1405, 1380, 1220, and 1100–1000 reciprocal centimeters. This compound is represented by the following structural formula

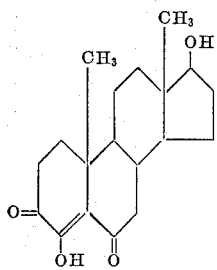

Example 9

To a solution of 1.46 parts of 4,17β-dihydroxyandrost-4-ene-3,6-dione in 320 parts of warm methanol is added 24 parts of concentrated hydrochloric acid, and the resulting reaction mixture is stored at room temperature for about 42 hours. Dilution with water followed by extraction with ether affords an organic solution which is washed with water, dried over anhydrous sodium sulfate and concentrated to dryness under reduced pressure. The resulting residue is chromatographed on a partition column containing diatomaceous earth with 20% aqueous methanol as the stationary phase. Elution of the column with 40% benzene in hexane affords a syrup which crystallizes on standing. Crystallization of that crude product first from ethyl acetate then from acetone affords pure 4,17β - dihydroxy - 3 - methoxyandrosta-2,4-dien-6-one, melting at about 203–207°. Ultraviolet absorption maxima are observed, in methanol, at about 274 and 340 millimicrons with molecular extinction coefficients of 4730 and 7450, respectively. This compound displays also infrared absorption maxima, in a potassium bromide disc, at about 3490, 3005, 2900, 1632, 1585, 1450, 1420, 1370, and 1050 reciprocal centimeters. Its structural formula is shown below:

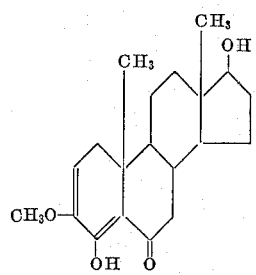

Example 10

To a solution of 2.16 parts of 4,17β-dihydroxy-3-methoxyandrosta-2,4-dien-6-one in 80 parts of warm methanol is added a solution of 1.29 parts of cupric acetate monohydrate in 40 parts of water. The resulting dark green mixture is heated at about 90° for about 5 minutes, then is allowed to cool to room temperature. The resulting precipitate is collected by filtration, washed on the filter with aqueous methanol and dried under reduced pressure. Recrystallization of that crude product first from chloroform-ethyl acetate, then from benzene-acetone, and finally from chloroform-acetone affords crystals of the copper complex of 4,17β-hydroxy-3-methoxyandrosta-2,4-dien-6-one. That material decomposes at about 240–260° and is further characterized by ultraviolet absorption maxima (1% in methanol) at about 281 and 352 millimicrons with extinction coefficients of about 157 and 194, respectively. Infrared absorption peaks, in a potassium bromide disc, are observed at about 3490, 1638, 1548, 1438, 1373, 1362, 1250, 1227, 1130, and 1050 reciprocal centimeters.

Example 11

To a solution of 2.6 parts of 4-hydroxypregn-4-ene-3,6,20-trione in 560 parts of warm methanol is added 42 parts of concentrated hydrochloric acid, and the resulting reaction mixture is allowed to stand at room temperature for about 50 hours, then is diluted with water and extracted with ether. The ethereal extract is washed with water, dried over anhydrous sodium sulfate, and taken to dryness under reduced pressure. Chromatography of the residue on a partition column consisting of diatomaceous earth with 20% aqueous methanol as the stationary phase followed by elution with 5% benzene in hexane affords a syrup which crystallizes on standing. Purification of that crude product by crystallization from ethyl acetate, then from methanol affords pure 4-hydroxy-3-methoxypregna-2,4-diene-6,20-dione, melting at about 224–227°. In methanol it exhibits ultraviolet maxima at 274 and 340 millimicrons with molecular extinction coefficients of 4830 and 7550, respectively. In a potassium bromide disc, infrared peaks are observed at about 3400, 3030, 2900, 1703, 1633, 1583, 1460, 1450, 1420, 1380, 1360, 1250, and 1195 reciprocal centimeters. This compound is represented by the following structural formula

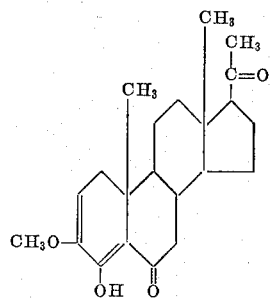

Example 12

To a solution of 2.33 parts of 4-hydroxypregn-4-ene-3,6,20-trione in 136 parts of warm ethanol is added a solution of 1.36 parts of cupric acetate monohydrate in 40 parts of warm water. The green cloudy solution is allowed to cool to room temperature, then is diluted with a large quantity of water. The resulting green precipitate is collected by filtration, washed on the filter with water, and dried in air. Three crystallizations of this precipitate from chloroform-ethanol affords a green amorphous solid which, upon heating, darkens at 180–200° and chars at 240–250°. Infrared maxima, in a potassium bromide disc, are observed at about 3570, 3050, 1715, 1577, 1450, 1390, 1358, 1235, and 909 reciprocal centimeters. It displays also an ultraviolet absorption maximum at about 322 millimicrons with an extinction coefficient, at a concentration of 1% in methanol, of 115.

Example 13

To a solution of 2.5 parts of 4-hydroxy-3-methoxypregna-2,4-diene-6,20-dione in 240 parts of warm methanol is added a solution of 1.38 parts of cupric acetate monohydrate in 40 parts of water. The dark green solution is allowed to cool to room temperature, then is concentrated to a small volume under reduced pressure. The dark green flocculent precipitate resulting is collected by filtration, then is dissolved in chloroform. That organic solution is washed with aqueous sodium acetate, dried over anhydrous sodium sulfate, and concentrated to dryness under reduced pressure to afford a green, gummy residue. That gum is crystallized twice from ethanol and once from benzene-hexane to afford the copper complex, melting at about 279–280° with decomposition. A 1% methanol solution exhibits ultraviolet absorption maxima at about 279 and 352 millimicrons with extinction coefficients of 150 and 173, respectively. Infrared absorption maxima, in a potassium bromide disc, are observed at about 2940, 1696, 1635, 1548, 1440, 1375, 1225, 1147, and 1035 reciprocal centimeters.

Example 14

To a solution of 2.5 parts of 4-hydroxy-3-methoxypregna-2,4-diene-6,20-dione in 120 parts of methanol containing 75 parts of chloroform is added a solution of 0.94 part of ferric chloride in 4 parts of water followed by a solution of 0.77 part of anhydrous sodium acetate in 10 parts of water. The resulting dark purple solution is warmed to about 80° for about 5 minutes, then is concentrated under reduced pressure to afford an oily solid residue. Crystallization of this residue from ethanol affords the crude product as a heavy red-brown precipitate. Further recrystallization from chloroform-hexane then from benzene-hexane yields the iron complex, which, upon heating, softens at about 220° and chars at about 300°. The ultraviolet absorption spectrum of a 1% methanol solution exhibits peaks at about 272 and 334 millimicrons with extinction coefficient of 132 and 161, respectively. In a potassium bromide disc, this compound displays infrared maxima at about 2940, 1697, 1635, 1550, 1443, 1367, 1227, and 1037 reciprocal centimeters.

Example 15

To a solution of 1.19 parts of 3-ethoxy-4-hydroxypregna-2,4-diene-6,20-dione in 20 parts of methanol is added 0.43 part of ferric chloride in 2 parts of water followed by a solution of 0.35 part of anhydrous sodium acetate in 4 parts of water. This reaction mixture is warmed at about 80° for about 15 minutes, after which time water is added, and the solution is allowed to cool. The resulting dark brown precipitate is collected by filtration and dried to afford the crude chelate, melting at about 188–195°. Purification by recrystallization first from chloroform-hexane then from benzene-hexane affords the pure chelate, melting at about 197–200°. A 1% methanol solution exhibits ultraviolet absorption maxima at about 273 and 335 millimicrons with extinction coefficients of 144 and 174, respectively. Its infrared absorption spectrum, in a potassium bromide disc, exhibits peaks at about 3400, 3000, 1703, 1638, 1550, 1445, 1375, and 1355 reciprocal centimeters.

Example 16

To a solution of 2 parts of 3-ethoxy-4-hydroxypregna-2,4-diene-6,20-dione in 144 parts of warm methanol is added a solution of 0.5 part of zinc acetate dihydrate in 20 parts of water followed by a solution of 0.55 part of anhydrous sodium acetate in 40 parts of water. The mixture is warmed to 80–90°, at which point 120 parts of methanol is added in order to dissolve the opaque precipitate which forms. To the warm mixture is then added dropwise 5.4 parts of ammonium hydroxide, and that solution is allowed to cool to room temperature. The resulting yellow precipitate is collected by filtration and washed on the filter with a small amount of aqueous methanol to afford the crude zinc chelate. Two recrystallizations of that crude product from acetone afford the pure chelate, which melts at abut 143–146°, resolidifies at about 160–210°, and melts again at 245–275° with decomposition. The ultraviolet absorption spectrum of a 1% methanol solution exhibits peaks at about 274 and 345 millimicrons with extinction coefficients of about 106 and 172, respectively. In a potassium bromide disc, infrared maxima are observed at about 3370, 2920, 1703, 1643, 1570, 1440, 1400, 1367, 1350, 1247, 1227, 1177, and 1045 reciprocal centimeters.

Example 17

The substitution of an equivalent quantity of ethanol in the procedure of Example 9 results in 3-ethoxy-4,17β-dihydroxyandrosta-2,4-dien-6-one of the structural formula

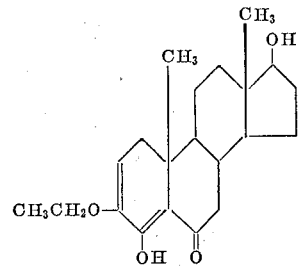

What is claimed is:
1. A member selected from the group consisting of compounds of the formula

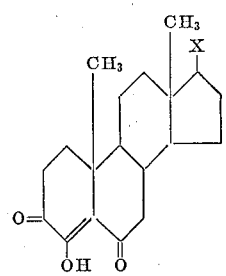

and the corresponding 3-(lower alkyl) enol ethers, wherein X is a member of the class consisting of hydroxy, acetoxy, and acetyl radicals.

2. 4-hydroxypregn-4-ene-3,6,20-trione.
3. 4,17β-dihydroxyandrost-4-ene-3,6-dione.
4. 17β-acetoxy-4-hydroxyandrost-4-ene-3,6-dione.
5. A compound of the formula
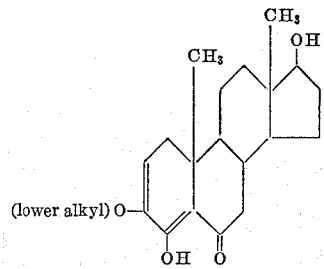
6. 4,17β-dihydroxy-3-methoxyandrosta-2,4-dien-6-one.
7. A compound of the formula
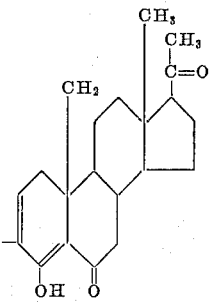
8. 3-ethoxy-4-hydroxypregna-2,4-diene-6,20-dione.
9. 4-hydroxy-3-methoxypregna-2,4-diene-6,20-dione.
No references cited.
LEWIS GOTTS, *Primary Examiner.*
HENRY A. FRENCH, *Assistant Examiner.*